United States Patent [19]

Taniguchi et al.

[11] 4,303,950
[45] Dec. 1, 1981

[54] HELICAL SCAN VIDEO TAPE RECORDER FOR RECORDING VIDEO AND AUDIO SIGNALS ON CONTIGUOUS TRACKS

[75] Inventors: Hiroshi Taniguchi, Hirakata; Osahiko Yano, Ibaragi; Chojuro Yamamitsu, Kawanishi; Sadafumi Kitamura, Neyagawa; Masamitsu Ohtsu, Kadoma, all of Japan

[73] Assignee: Matsushita Electric Industrial Co., Ltd., Osaka, Japan

[21] Appl. No.: 56,845

[22] Filed: Jul. 12, 1979

[30] Foreign Application Priority Data

Jul. 20, 1978 [JP] Japan .................................. 53-89053
Aug. 29, 1978 [JP] Japan ................................. 53-106143

[51] Int. Cl.$^3$ ........................ H04N 5/78; G11B 5/49
[52] U.S. Cl. ......................................... 360/19; 360/8; 360/10; 360/23; 360/64
[58] Field of Search ..................... 360/8, 9, 10, 18, 19, 360/22, 23, 33, 35, 64; 358/143, 144, 145

[56] References Cited

U.S. PATENT DOCUMENTS

| | | | |
|---|---|---|---|
| 3,715,481 | 2/1973 | Harr | 360/35 |
| 3,789,137 | 1/1974 | Newell | 360/19 X |
| 3,878,560 | 4/1975 | Ramage | 360/10 |
| 3,909,512 | 8/1975 | Omori et al. | 360/10 X |
| 3,934,268 | 1/1976 | Uemura | 360/10 X |

FOREIGN PATENT DOCUMENTS 2849791  5/1979  Fed. Rep. of Germany ........ 360/19

Primary Examiner—Daryl W. Cook
Assistant Examiner—Donald McElheny, Jr.
Attorney, Agent, or Firm—Burgess, Ryan and Wayne

[57] ABSTRACT

In a magnetic recording and reproducing system of the type wherein a plurality of rotating magnetic heads record the video signal on a magnetic tape as tracks which are inclined at an angle relative to the direction of travel of the magnetic tape, the audio signal is time compressed and recorded by the rotating magnetic heads on tracks contiguous with either or both ends of said video signal recording tracks, whereby even at a considerably low tape transport speed the audio signal may be recorded in a stable manner.

9 Claims, 21 Drawing Figures

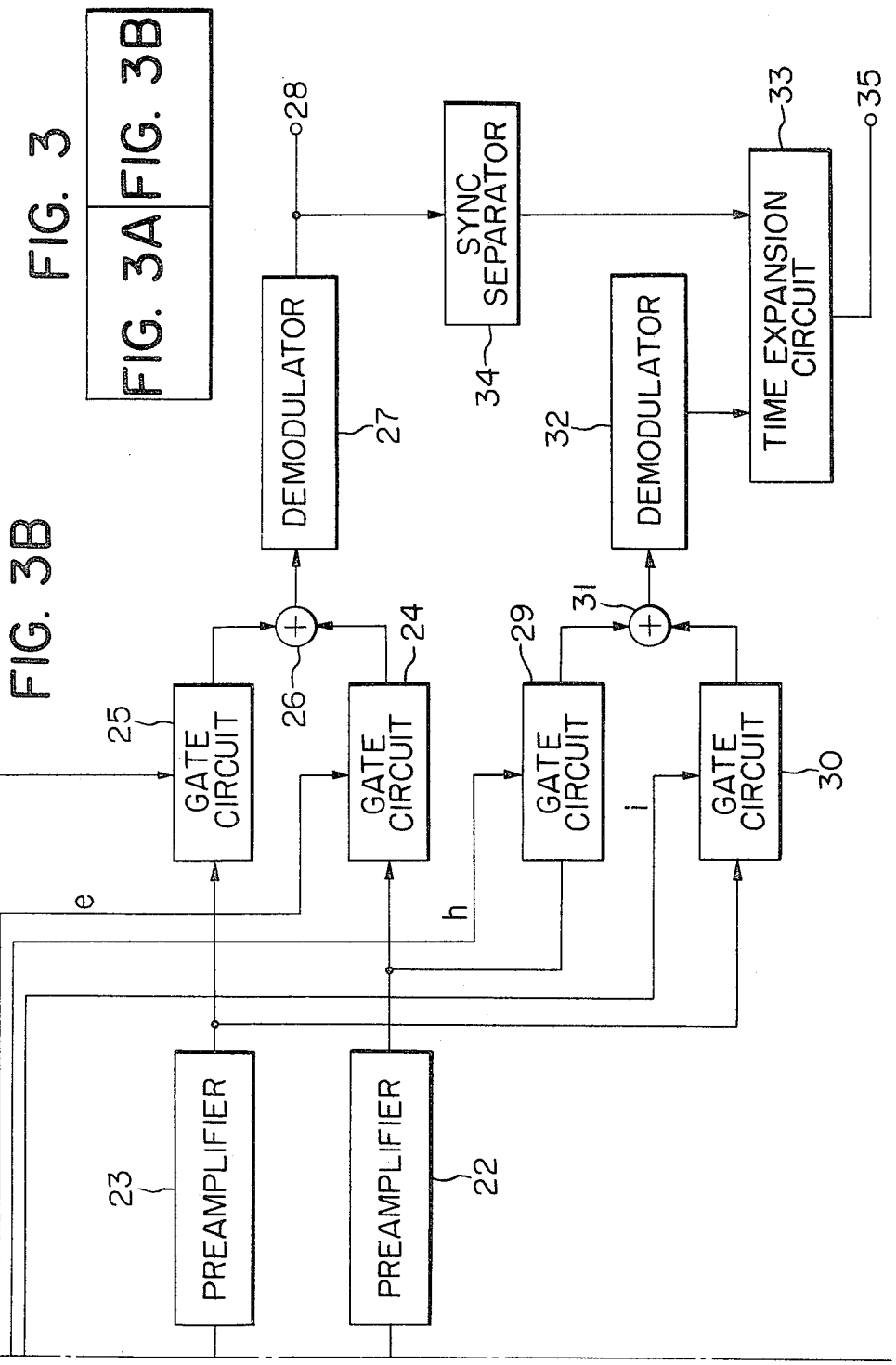

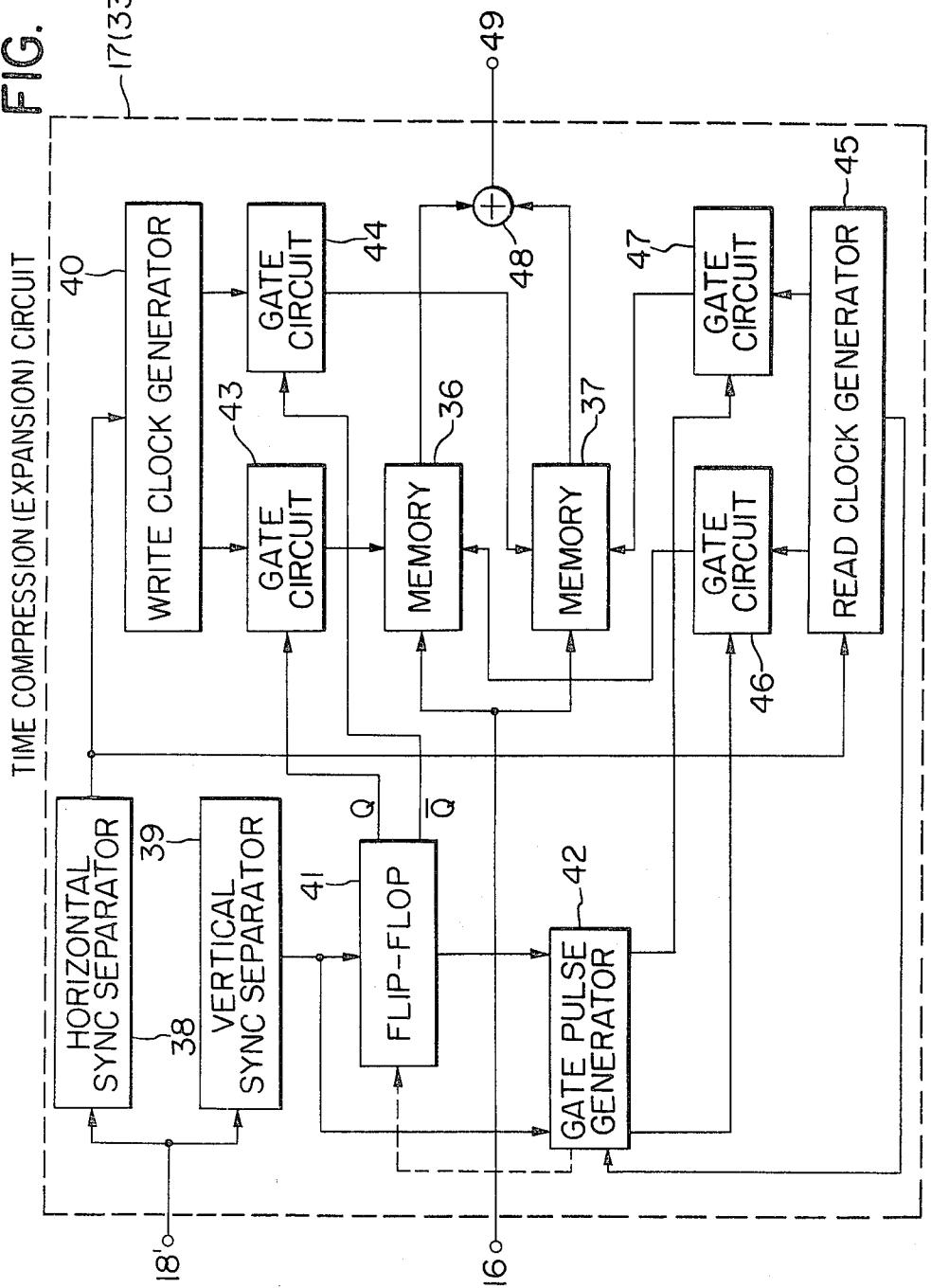

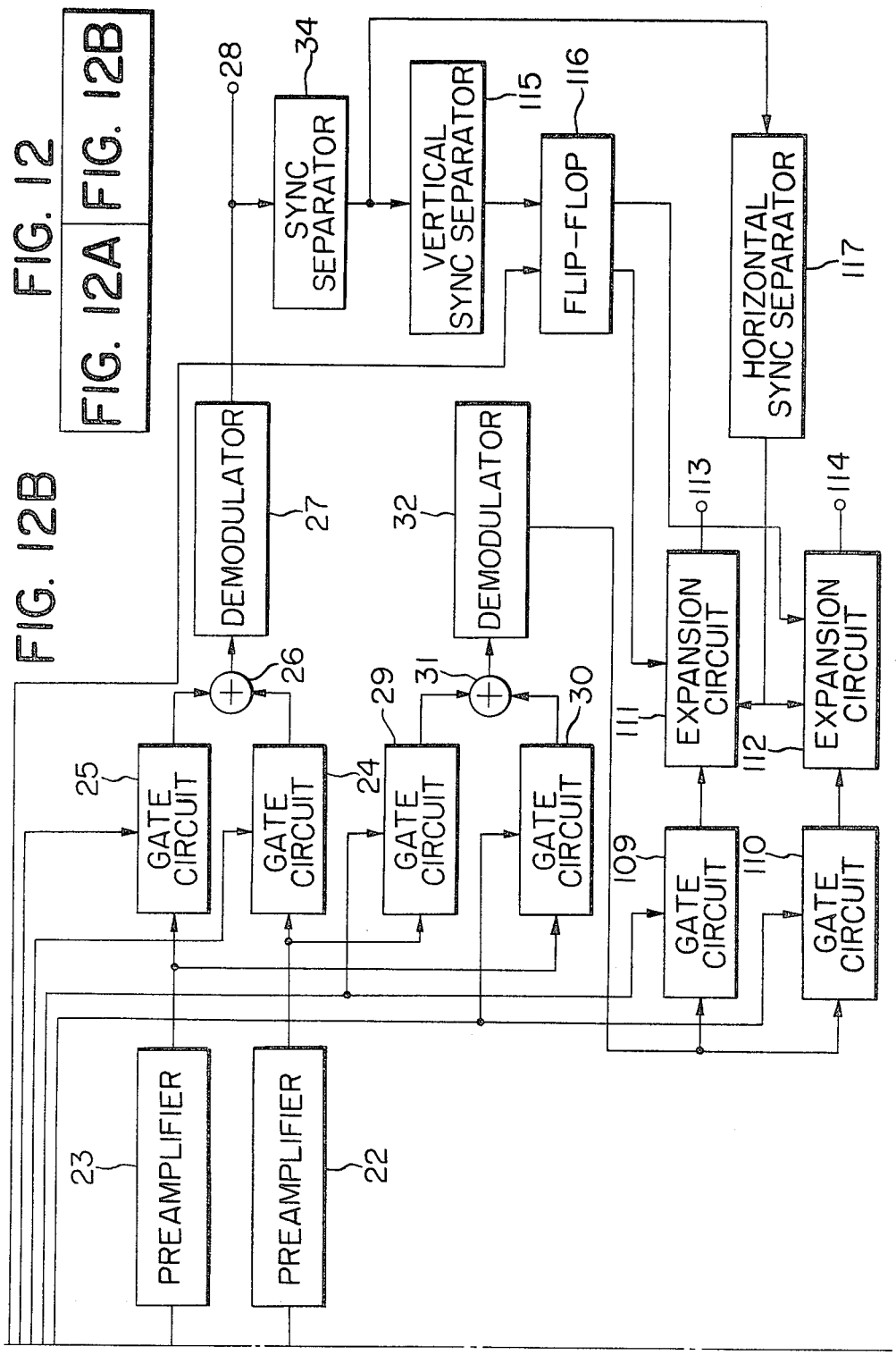

HELICAL SCAN VIDEO TAPE RECORDER FOR RECORDING VIDEO AND AUDIO SIGNALS ON CONTIGUOUS TRACKS

BACKGROUND OF THE INVENTION

The present invention relates to a magnetic video signal recording and reproducing system (to be referred to as "VTR" in this specification) of the type wherein a plurality of rotating heads record the video signal on sequential discontinuous tracks on a magnetic tape and more particularly a magnetic recording and reproducing system which may record and reproduce the audio signal even when the tape transportation speed is considerably low.

In the prior art VTR, the video signal is recorded by a plurality of rotating magnetic heads on tracks inclined at an angle relative to the direction of transport of the magnetic tape and the audio signal is recorded by a stationary head on the edge of the magnetic tape.

The recording density of the video signal has been remarkably increased in VTR because of the improvements of the magnetic tapes, heads, techniques for processing the signal, accuracies and control techniques.

For instance, VHS VTR (capable of recording for four hours) has a recording density which is about 92 times as high as that of VTR units commonly used by broadcasting stations (of the type which uses a magnetic tape two inches in width and four heads) and about 11 times as high as that of EIAJ-I type VTR. VHS VTR uses a magnetic tape one half inch in width which is transported at the speed of 1.65 cm/sec. Extensive studies and experiments are continuing in order to further improve the characteristics of tapes and heads so that the recording density will be further increased in the future.

For instance, assume that the recording density will be doubled. Then the tape transport speed would become about 0.8 cm/sec when a magnetic tape with a half inch in width is used. At such a low transport speed, the magnetic recording and reproducing system with a stationary audio signal recording head cannot achieve high quality recording and reproduction because of the following reasons.

(a) At a low tape transport speed, the recording wavelengths become shorter so that the recording and reproduction of high frequencies becomes difficult and consequently a sufficient audio signal bandwidth (higher than 10 KHz) cannot be provided. (At a tape transport speed of 1 cm/sec, the highest frequency attainable at the present level of the audio-video techniques is 5 KHz.)

(b) At a low tape transport speed, the output from a reproducing head decreases, a low S/N results and hum occurs.

(c) At a low tape transport speed, the dynamic range of the level of the recorded signal becomes narrower and distortions tend to occur very frequently.

(d) Accuracies of a system for transporting a magnetic tape at a low speed in a stable manner are limited so that wow and flutter are enhanced.

Because of the reasons described above, even though the video signal may be recorded at a high density the audio signal cannot be recorded at a high density.

One of the methods for obtaining a relatively high tape transport speed even when the recording density of the video signal is increased is to reduce the width of a magnetic tape to for instance ¼ or ⅛ inches. When the recording density is same, a magnetic tape with the width of ¼ inches must be increased in length twice as long as a magnetic tape with the width of ½ inches. As a result, a tape cassette may be slightly reduced in thickness but increased in surface area. (Since the wall thickness of a case, the thickness of reel hubs and the spacing between the case and the reels remain unchanged, the thickness cannot be reduced to one half but to ⅝.) As a result, a cassette loading a magnetic tape with the width of ¼ inches would become considerably large in size as compared with a cassette containing a magnetic tape with the width of ½ inches when both the tapes are assumed to be capable of recording for two hours. Furthermore the ¼ inch tape cassette would be unbalanced. With a magnetic tape with the width of ⅛ inches, a relatively high tape transport speed may be attained, but its cassette would be extremely unbalanced. In addition to the problem of shapes of cassettes, the reduction in width of magnetic tapes gives rise to the problem of skew due to the expansion and compression of a magnetic tape (that is, the discontinuity in time of the signal when the heads are switched from one to another). Furthermore the angle of inclination of the video tracks relative to the direction of travel of a magnetic tape would become small so that the recording and reproduction is easily susceptible to adverse effects by waving of a magnetic tape and consequently the interchangeability of magnetic tape cannot be ensured. Moreover a satisfactory air film would not be produced between a head and a magnetic tape so that the transport of the magnetic tape becomes unstable, resulting in jitter. Thus it is apparent that the wider the magnetic tape, the better the recording and reproduction becomes.

As described above, because of the prior art audio signal recording and reproduction systems, the recording density cannot be increased and the cassette in desired shape and size cannot be provided.

One solution to the above problems is to frequency modulate the audio signal at frequencies exterior to and lower than the bandwidth of the frequency modulated video signal, multiplex with the video signal and then record the multiplexed signal on a magnetic tape as in the case of the video disk techniques. However with this frequency multiplex system, it is impossible to record the audio signal after the video signal has been recorded. This system may be applied to an apparatus used only for reproducing signals such as a video disk, but cannot be applied to an apparatus for recording and reproducing the audio and video signals such as a VTR.

SUMMARY OF THE INVENTION

Accordingly the main object of the present invention is to provide a magnetic recording and reproducing system which may attain the reliable and stable recording and reproduction of the audio signal even at a low tape transport speed by the time compression and expansion of the audio signal.

BRIEF DESCRIPTION OF THE DRAWINGS

FIGS. 3A-3B are block diagrams of a first embodiment of a magnetic recording and reproducing system in accordance with the present invention;

FIG. 4 is a block diagram of a time compression (expansion) circuit shown in FIG. 3;

Same reference numerals are used to designate similar parts throughout the figures.

DESCRIPTION OF THE PREFERRED EMBODIMENT

Figure 1A:
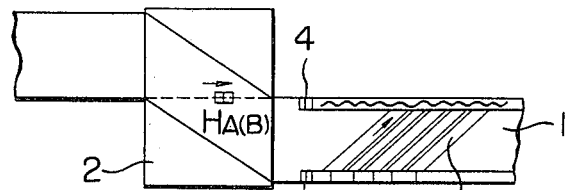
FIG. 1(a) is a schematic side view of a prior art video tape recorder.
Figure 1B:
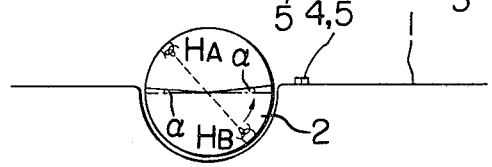
FIG. 1(b) is a top view thereof.

FIG. 1 is a view used for the explanation of the recording mode of a prior art two rotating head helical scanning type VTR. A magnetic tape 1 is wrapped about 180° (180°+2α) around a rotating head cylinder 2 with two rotating heads $H_A$ and $H_B$ so that the video signals are recorded in discontinuous oblique tracks 3. The audio signal is recorded by a stationary audio signal recording head 4 on a sound track along the upper edge of the magnetic tape 1. The control signal, which is used as the reference signal in the playback mode, is recorded by a control head 5 on a control track along the lower edge of the magnetic film 1.

In contrast to the prior art recording system described above, according to the present invention, the audio signal can be recorded by the rotating heads $H_A$ and $H_B$ without the use of a stationary audio signal recording head. The angle through which the magnetic tape 1 is wrapped around the rotating head cylinder 2 is increased by θ as compared with the prior art system. That is, the magnetic tape 1 is wrapped through an angle = 180°+2α+θ around the rotating cylinder 2. The audio signal is compressed and recorded on the upper tracks 6 which are provided by increasing the wrapping angle by θ.

Figure 5:
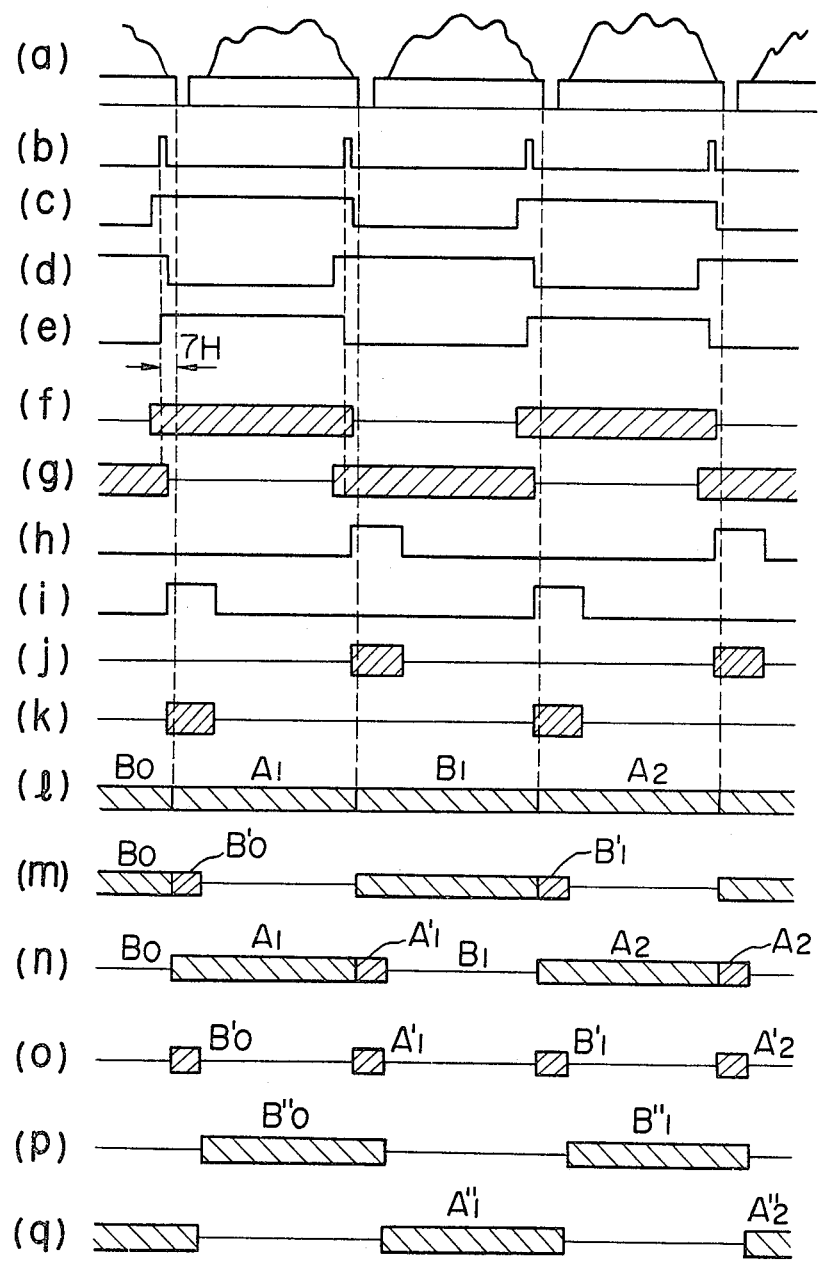
FIG. 5, consisting of a-q, is a timing chart used for the explanation of the mode of operation of the first embodiment.

Next referring to FIGS. 3-5, a circuit for recording one channel audio signal in the manner described above will be explained. First referring to FIG. 3, the video signal to be recorded is applied to a terminal 7 and is frequency modulated by a frequency modulator 8. In response to the pulse from a gate pulse generator 15, the output signal from the frequency modulator 8 is gated by gate circuits 9 and 10. The gate pulse generator 15 is so designed and constructed as to generate various timing pulses in response to the output signal from a phase detector PG which detects the phase in rotation of the rotating heads $H_A$ and $H_B$. More particularly, reference is made to FIG. 5. The phase detector PG generates the pulse (b) which leads the vertical synchronizing signal of the incoming video signal (a) by for instance seven horizontal synchronizing interval 7H. In response to the output from the phase detector PG, the gate pulse generator 15 generates gates pulses (c) and (d) which overlap each other for about 4H before and after the output pulse (b) from the phase detector PG. As a result, the output from the frequency modulator 8 is gated by the gate circuits 9 and 10 as shown at (f) and (g) and are applied to adders 11 and 12.

The audio signal is applied to a terminal 16 and is time compressed by a time compression circuit 17. The output from the time compression circuit 17 is applied to a frequency modulator 19. Sync signal separated by a sync separator 18 from the incoming video signal is also applied to the time compression circuit 17 which will be described in detail below. Thus time compressed and frequency modulated audio signal is transmitted to gate circuits 20 and 21 which gate it as shown at (j) and (k) in FIG. 5 in response to gate pulse (h) and (i). The gated signals are applied to the adders 11 and 12 which add the frequency modulated video signals (f) and (g) and the frequency modulated audio signals (j) and (k). The pulses (h) and (i) may be derived from monostable multivibrators which are triggered in response to the falling or trailing edges of the pulses (c) and (d).

Figure 2A:
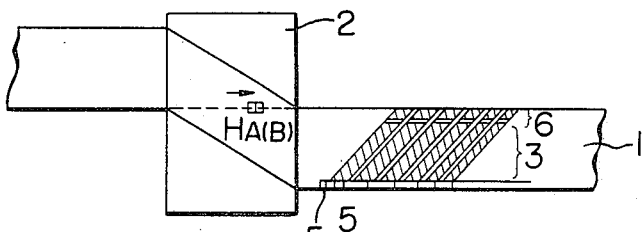
FIG. 2(a) is a schematic side view of a video tape recorder in accordance with the present invention.
Figure 2B:
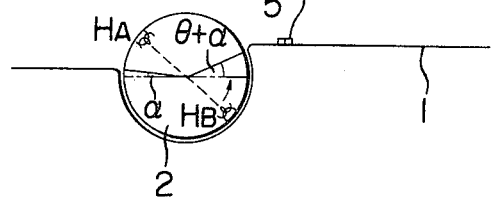
FIG. 2(b) is a top view thereof.

The outputs from the adders 11 and 12 are transmitted to the rotating heads $H_A$ and $H_B$ through recording amplifiers 13 and 14 and record-playback switches SW1 and SW2, respectively, and are recorded in the tracks shown in FIG. 2.

In the playback mode, the signals reproduced by the rotating heads $H_A$ and $H_B$ are transmitted to preamplifiers 22 and 23 through the switches SW1 and SW2 whose movable contacts are now closing the stationary contacts P instead of R. The output from the preamplifier 22 and 23 are applied to gate circuits 24, 25, 29 and 30. In response to the pulse (e) from the gate pulse generator 15 which in turn is generated in response to the output (b) from the phase detector PG, the gate circuit 24 gates the reproduced frequency modulated video signal (f) for the interval Hi of the pulse (e). In response to the pulse opposite in polarity to the pulse (e), the gate circuit 25 gates the reproduced video signal for the time interval Hi. The outputs from the gate circuits 24 and 25 are added in an adder 26 so that the continuous video signal may be reproduced.

In response to the gate pulses (h) and (i) from the gate pulse generator 15, the gate circuits 29 and 30 gate the reproduced audio signals as shown at (j) and (k). The gated audio signals (j) and (k) are added in an adder 31 so that the continuous audio signal may be reproduced and applied to a demodulator 32.

The output from the adder 26 is applied to a demodulator 27 so that the reproduced video signal may be derived from its output terminal 28.

The output from the demodulator 32 is applied to a time expansion circuit 33 which expands the demodulated audio signal in response to the output from a sync separator 34 so that the reproduced audio signal may be derived from its output terminal 35. The time expansion circuit 33 will be described in detail below.

Referring particularly to FIG. 4, the time compression circuit 17 will be described in detail. The incoming audio signal is applied to the terminal 16 and then transmitted to two memory circuits 36 and 37.

The output from the sync separator 18 is applied to a terminal 18' and then applied to horizontal sync separator 38 and a vertical sync separator 39. The output from the horizontal sync separator 38 is applied to a write clock generator 40 and to a read clock generator 45. The write clock generator 40 generates the clock whose frequency $f_W$ is for instance two times as high as the frequency $f_H$ of the horizontal sync; that is, $f_W=31.5$ KHz. In response to the clock signal (whose frequency $f_W=2f_H=31.5$ KHz), the audio signal whose frequency range is up to one half (15 KHz) of the clock frequency $f_W$ may be stored in the memories M-1 and M-2.

The output from the vertical sync separator 39 is applied to a flip-flop 41 from which is derived the output signal, or gate pulses $Q$ and $\overline{Q}$ of 30 Hz (in the case of NTSC SYSTEM, but 25 Hz in case of the PAL system). In response to the gate pulses $Q$ and $\overline{Q}$ gate circuits 43 and 44 gate write clocks to be applied to the memory circuits 36 and 37 so that the audio signal of the odd field may be stored in the memory circuit 36 while the audio signal of the even field may be stored in the memory circuit 37. The memory has 525 bytes. The portions $A_1$ and $A_2$ of the incoming audio signal shown at (1) in FIG. 5 are stored as $A_1$ and $A_2$ in the memory circuit 36 as shown at (n). The portions $B_1$ and $B_2$ of the incoming audio signal are stored as $B_1$ and $B_2$ in the memory circuit 37 as shown at (m) in FIG. 5. The audio signals thus stored in the memory circuits 36 and 37 are read out in response to the clocks from the read clock generator 45. It is assumed that the frequency $f_R$ of the read clock be 40 times as high as the horizontal sync frequency $f_H$; that is, $f_R=40\ f_H$. Then $$f_R/f_W=40f_H/2f_H=20$$

Therefore it follows that the audio signal stored during a time interval $\tau_v=1/f_v$ (where $f_v=$vertical scanning frequency) may be read out during a time interval $\tau_v/20$. In other words, the audio signals $A_1$, $A_2$, ... which are stored in the memory circuit 36 are time compressed to 1/20 and are read out as indicated $A'_1$, $A'_2$, ... as shown at (n). In like manner, the audio signals $B_1$, $B_2$, ... which have been stored in the memory circuit 37 are time compressed to 1/20 and are read out as $B'_1$, $B'_2$, ... as shown at (m). The outputs from the memory circuits 36 and 37 are applied to an adder 48 from which the compressed audio signals may be derived as shown at (p).

The mode of generating the read clock pulse will be described. In response to the leading edge of the vertical sync separated by the vertical sync separator 39, a gate pulse generator 42 generates gate pulses which correspond to 525 read clock pulses. In response to the gate pulses, gate circuits 46 and 47 gate alternately the read clock pulses to be applied to the memory circuits 36 and 37 for a time interval equal to one field interval. The output from the flip-flop 41 is also applied to the gate pulse generator 42 so that the gating timing of the gate circuits 46 and 47 may be synchronized with that of the flip-flop 41.

It is the most reliable method to count the read clock pulses so that the pulse width of the gate pulse generated by the gate pulse generator 42 may exactly coincide with 525 read clock pulses, but in the recording mode it is not needed to make the pulse width of the gate pulse to coincide with 525 read clock pulses. The gate pulse may have a pulse width slightly longer than 525 read clock pulses.

Figure 3A:
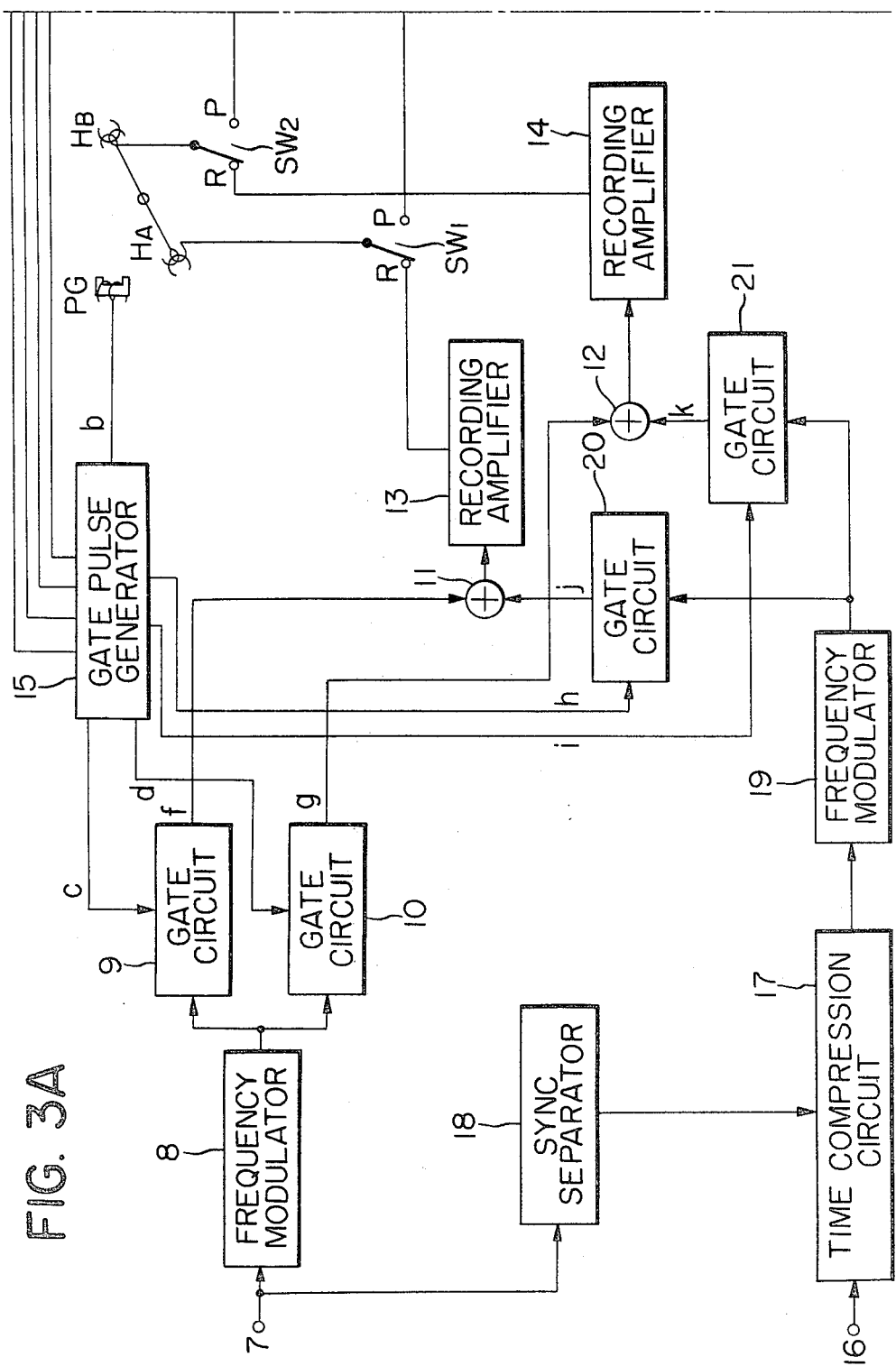

The time compressed audio signal thus derived is transmitted from an output terminal 49 to the modulator 19 and gated by the gate circuits 20 and 21 in the manner described elsewhere in conjunction with FIG. 3. As shown at (h) and (i), the gating interval is longer than the compressed audio signal shown at (p) so that interference to the audio signal by the transient noise caused when the FM carrier is switched in the case of demodulation.

Next the expansion circuit 33 will be described. It is substantially similar in construction to the time compression circuit 17 described above except (1) that the write clock generator 40 is used as a write clock generator while the read clock generator 45 is used as a write clock generator and (2) that the flip-flop 41 is not triggered by the output from the vertical sync separator 39 but by the trailing edge of the write pulse (in the reproduction mode) from the gate pulse generator 42 as indicated by the broken lines. Furthermore it is required to reset the flip-flop 41 in order to select the polarity of the output pulse therefrom. The demodulated time compressed audio signals $B'_0$, $A'_1$, $B'_1$, $A'_2$, $B'_2$, ... shown at (p) in FIG. 5 are time expanded as $B''_0$, $A''_1$, $B''_1$, $A''_2$, $B''_2$, ... as shown at (q) and (r) so that derived from the output terminal of the time expansion circuit 33 is the continuous audio signal which lags behind the video signal by about one field (about 16 msec).

The time difference between the video signal and the audio signal is not noticed when it is in general less than 50 msec so that the time delay of 16 msec is quite negligible.

The memory circuits so far described are BBD, capacitor memories or analog memories such as CCD, but it is to be understood that digital memories may be also used when A/D and D/A converters are inserted between the input terminal 16 and the memory circuits 36 and 37 and between the memory circuits 36 and 37 and the adder 48. The mode of operation is substantially similar to that described above.

Next the frequency band of the compressed audio signal will be discussed. When the audio signal up to about 15 KHz is time compressed to 1/20 in the manner described above, it has the frequency band of 300 KHz which is considerably narrow as compared with the video signal band of 3 MHz. Therefore in the case of frequency modulation, the carrier may be selected between hundreds KHz and a few MHz and the recording and reproduction with a satisfactory signal to noise ratio S/N may be ensured. This means that the audio signal may be further time compressed from 1/20 to 1/100 and that the frequency division may be used by modulating different carriers by two audio signals.

Referring back to FIG. 2, the additional angle $\theta$ is preferably slightly greater than $180°/20=9°$. The increase in tape wrapping angle will not adversely affect the transportation of the magnetic tape 1.

So far in the recording mode the audio signal has been described as being time compressed and then frequency modulated, but it is to be understood that the time compressed audio signal may be phase or amplitude modulated.

Furthermore it is apparent that when the audio signal is converted into the digital signal and then time compressed, the time compressed digital signal may be recorded. (When the sampling frequency is 30 KHz and one sample is transmitted in ten bits, the clock frequency is 3 MHz even when the audio signal is time compressed to 1/10. The clock pulse frequency of 3 MHz is within the 4 MHz band of the video signal so that the time compressed, digital audio signal may be equally recorded by the rotating video signal recording heads.)

The time compressed audio signal is time expanded in the expansion circuit 33 in the playback mode. In this case, the compressed audio signal has been described as being stored in the memory circuits in response to the leading edge of the vertical sync signal which is reproduced, but it is also possible to correctly determine the timing for storing the compressed audio signal into the memory circuits without the use of the reproduced vertical sync signal as will be described below with reference to FIG. 6.

FIG. 6(a) shows the waveforms of the video signal adjacent to the vertical sync signal V. FIGS. 6(b) and (c) show the signals which are frequency modulated by the video signals shown at (1) in FIG. 5 and which overlap each other for a time interval of about 4H before and after the time point B at which the scanning of the video signal tracks is switched from one rotating reproducing head to another.

Figure 6:
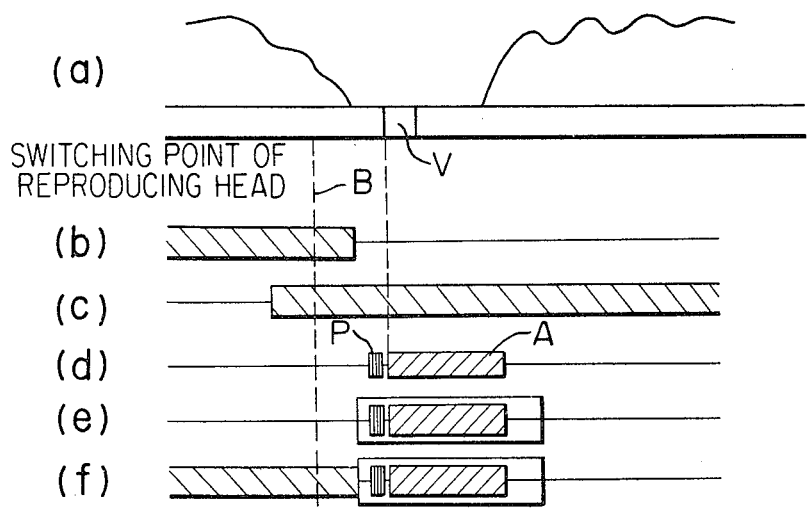
FIG. 6, consisting of a-f, is a timing chart used for the explanation of a further method for attaining the timing for writing the time compressed audio signal into a memory circuit in the playback mode.

As shown at (d) in FIG. 6, the burst signal P which is generated in response to the clock signal, is inserted immediately before the time compressed audio signal A so that in the playback mode the compressed audio signal may be stored into the memory circuits a predetermined time (which may be zero) after the termination of the burst signal P. The burst signal P and the audio signal A are frequency modulated and gated for a time interval which is sufficiently longer than the length of the burst and audio signals P and A so that the frequency modulated signal as shown at (e) in FIG. 6 may be derived. The signal (e) is added to the video signal (b) so that the audio signal may be recorded on the track which is additionally provided by increasing the wrapping angle of the magnetic tape 1 by $\theta$ as described elsewhere.

Figure 7:
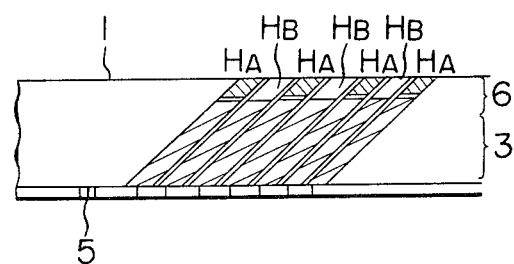
FIGS. 7-10 show various audio and video signal recording patterns.
Figure 8:
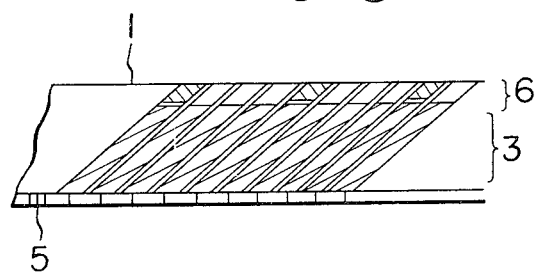

Next the audio signal recording patterns which are different from that shown in FIG. 2 will be described. First referring to FIG. 7, in contrast to the recording pattern shown in FIG. 2 wherein the audio signal is recorded by both the two rotating heads $H_A$ and $H_B$, the audio signal is recorded on the tape 1 only by one of the recording heads. To this end, the audio signal corresponding to two fields may be time compressed to 1/40. The frequency band of thus compressed audio signal becomes 600 KHz, which is still within the range at which the rotating magnetic heads may record and reproduce. Therefore the circuits described with reference to FIGS. 3 and 4 may be equally used. However the memory capacity must be doubled and two flip-flops 41 must be provided. The gate circuits 21 and 30 (See FIG. 3) may be eliminated. The recording pattern shown in FIG. 7 is advantageous in that even when the mistracking occurs, no audio signal is reproduced from the adjacent track so that cross talk may be eliminated.

Alternatively, the audio signal corresponding to four fields may be compressed and recorded on every four tracks, but the memory capacity must be increased accordingly. In like manner, the audio signal corresponding to three fields may be time compressed and recorded on every three tracks, but in case of the VTR with two rotating magnetic heads, two head must alternately record the audio signal so that the circuit becomes complicated. However with three rotating magnetic heads, one of them may record and reproduce so that the circuit will be simple in construction. In this sense, with four rotating magnetic heads, the method for recording the audio signal on every four tracks as described above may be advantageous.

When the tracking error occurs in the playback mode, cross talk may be eliminated in the following manner. That is, the frequency of the audio signal carrier to be recorded on one track is made different from the frequency of the audio signal carrier to be recorded on the next track so that the frequency band of the audio signal carrier to be recorded by one rotating magnetic head may not overlap the frequency band of the audio signal carrier to be recorded by the other rotating magnetic recording head. To this end, the modulator 19 shown in FIG. 3 may be so designed and constructed as to alternately switch two carrier frequencies and bandpass filters corresponding to the used carrier frequencies are inserted between the gate circuits 29 and 30 and the adder 31 (See FIG. 3).

Figure 9:
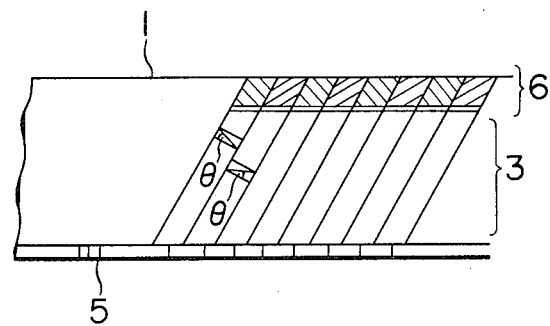

A further method for eliminating cross talk is to use the azimuth recording which is employed in VHS VTR as shown in FIG. 9. That is, the gaps of the two rotating magnetic heads $H_A$ and $H_B$ are inclined at an angle in opposite directions. In the playback mode, the azimuth loss is therefore increased so that the cross talk between the adjacent tracks may be minimized.

Figure 10:
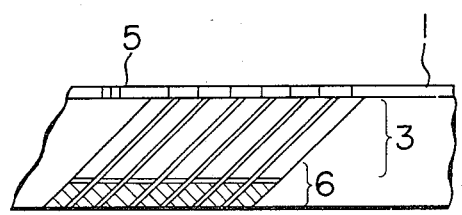

So far the control signal has been described as being recorded on the track along the lower edge of the magnetic tape 1 while the audio signal has been described as being time compressed and recorded at the upper portions of the oblique tracks, but it is to be understood that the control signal may be recorded on the control track along the upper edge of the tape 1 while the audio signal is compressed and recorded at the lower portions of the oblique tracks as shown in FIG. 10. (In some systems no control track is required, however.) In this case, a circuit which is substantially similar to that shown in FIG. 3 may be used even though timing relationship must be changed, and the magnetic tape 1 is wrapped $\theta°$ more at the entering side of the rotating cylinder 2 (See FIG. 2).

So far the present invention has been described only in conjunction with the two head-helical scan type VTR, but it is to be understood that the present invention may be also equally applied to VTR systems with more than two rotating magnetic heads. Therefore the present invention may be also applied to devices of the type recording on recording media in the form of a card.

So far the video signal for one field has been described as being recorded on each oblique track, but it is also to be understood that the present invention may be equally applied to the systems in which the video signal for two fields or for 1/n fields (where n is an integer) are recorded on each oblique track.

So far the present invention has been described in conjunction with the recording of one channel audio signal, but the present invention may be also used to record two channel audio signals as will be described below.

Figure 11:
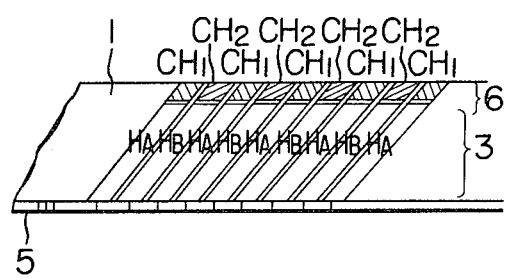
FIG. 11 shows a pattern for recording not only the video signal but also two channel audio signals.

First referring to FIG. 11, the audio signal in the channel 1 CH1 is time compressed and recorded by one rotating magnetic head $H_A$ in a manner substantially similar to that described above with reference to FIG. 7 while the audio signal in the channel 2 CH2 is compressed and recorded by the other rotating magnetic head $H_B$ at the upper edges of the oblique tracks HB. In case of tracking error, cross talk results, but when the gaps of the rotating magnetic heads are inclined at an angle in opposite directions as described elsewhere with reference to FIG. 9, cross talk between the adjacent tracks may be suppressed by azimuth losses.

Figure 12A:
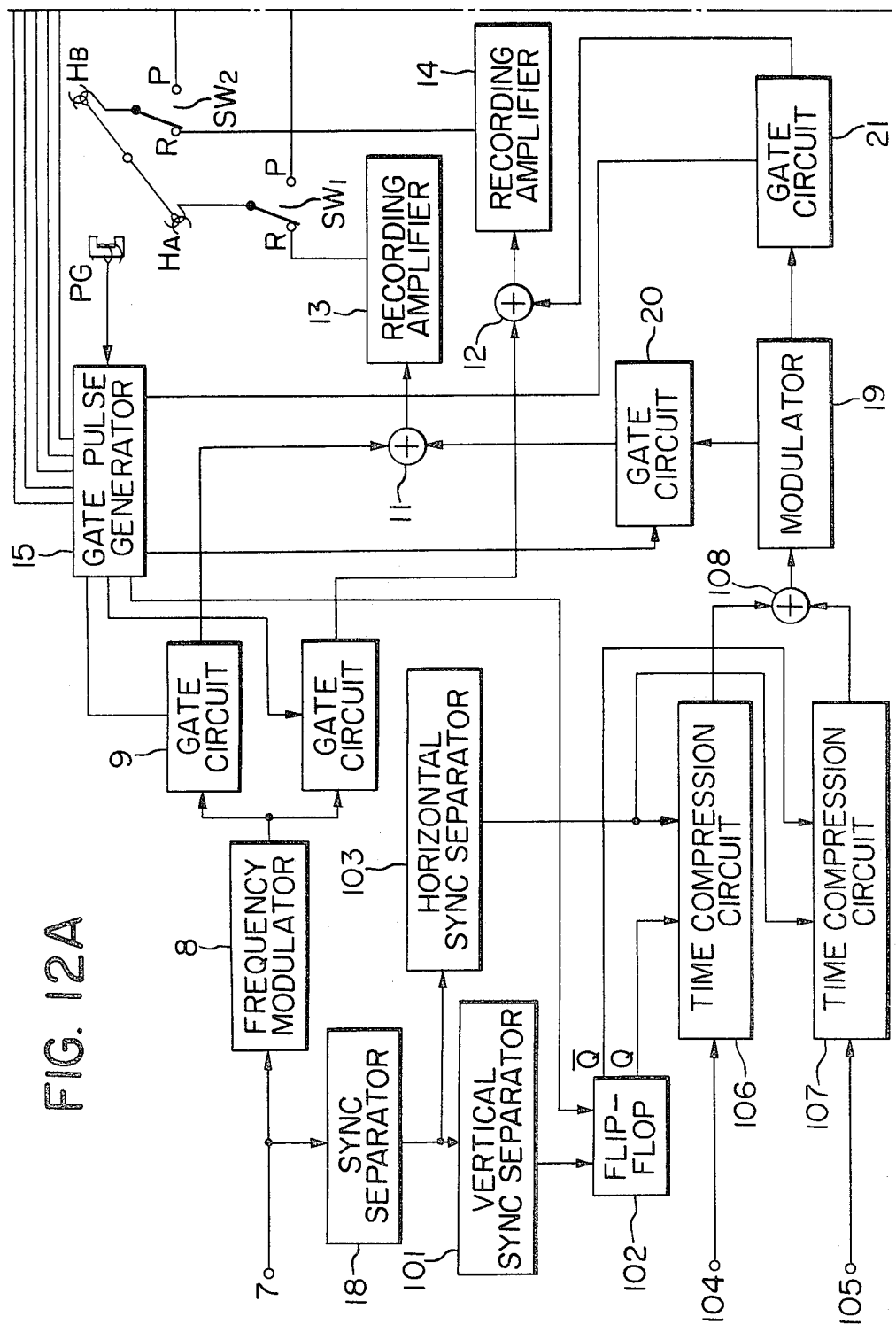
FIGS. 12 A-12B are block diagrams of a magnetic recording and reproducing system of the present invention capable of recording not only the video signal but also two channel audio signals.

Next referring further to FIGS. 12 and 13, a magnetic recording and reproducing system capable of recording and reproducing two channel audio signals together with the video signal will be described in detail. The system shown in block diagram in FIG. 12 is substantially similar in construction to that shown in FIG. 3 except that circuits with reference numerals 101-117 are added. That is, reference numeral 101 denotes a vertical sync separator; 102, a flip-flop; 103, a horizontal sync separator; 104 and 105, input terminals for receiving the incoming audio signals of the channels 1 and 2; 106 and 107, time compression circuits; 108, an adder; 109 and 110, gate circuits; 111 and 112, time expansion circuits; 113 and 114, output terminals from which the reproduced audio signals of channels 1 and 2 may be derived; 115, a vertical sync separator; 116, a flip-flop and 117, a horizontal sync separator.

Figure 13:
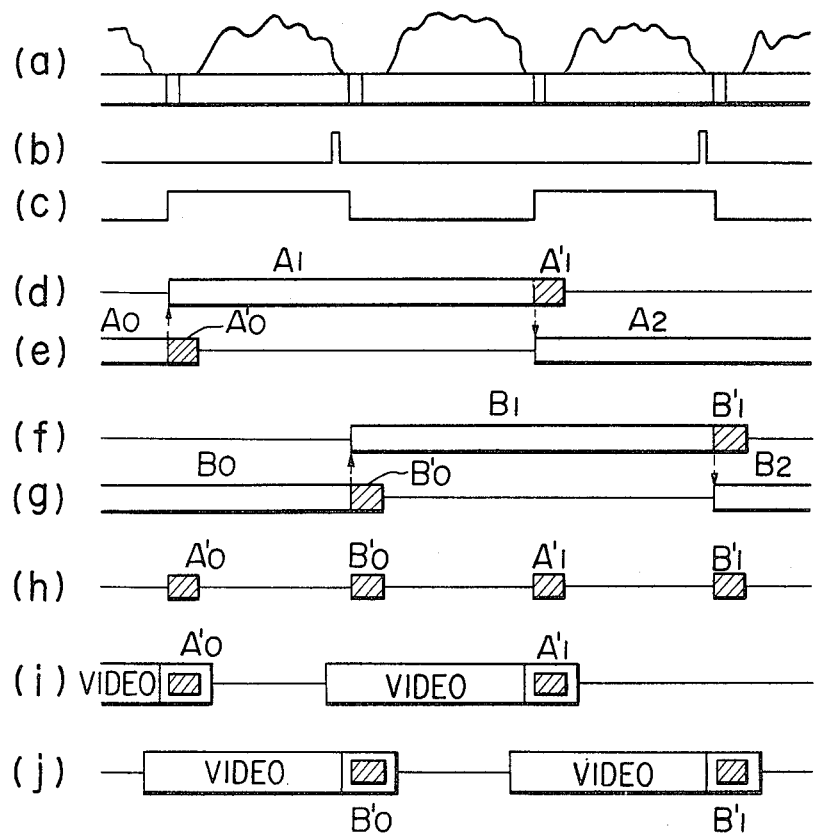
FIGS. 13a-j are timing charts used for the explanation of the mode of operation thereof.

The flip-flop 102 is triggered by the output from the vertical sync separator 101, and the polarities of its outputs are determined in response to the gate pulse from the gate pulse generator 15 which in turn is generated in response to the PG pulse shown at (b) in FIG. 13 from the phase detector which detects the phase in rotation of the rotating magnetic head $H_A$. For instance, the flip-flop 102 generates the output signal Q as shown at (c) in FIG. 13. In response to the positive edge of the output signal Q, the incoming audio signal of the channel 1 CH1 applied to the input terminal 104 is stored into one of two memory circuits in the time compression circuit 106. That is, the audio signal $A_1$ for two fields (=32 msec) is stored as shown at (d). As soon as the audio signal $A_1$ has been stored, it is read out at a rate for instance 20 times as fast as the writing speed as $A'_1$. Simultaneously the succeeding audio signal $A_2$ of the channel 1 CH1 is stored into the other memory circuit in the compression circuit 106 as indicated at (e) and is read out as $A'_2$. In recording the audio signal of channel 1 CH1, the above steps are cycled.

In response to the negative edge of the output pulse Q shown at (c) in FIG. 13, the audio signal of the channel 2 CH2 corresponding to two-fields is stored as $B_1$ into one of two memory circuits in the time compression circuit 107 as indicated at (f) and is read out as $B'_1$ at a reading speed 20 times as fast as a writing time. The succeeding audio signal is stored as $B_2$ into the other memory circuit in the compression circuit 107 and is read out as $B'_2$. In recording of the audio signal of the channel 2, the above steps are cycled.

As a consequence, derived from the adder 108 are the compressed audio signals $A'_0$, $B'_0$, $A'_1$, $B'_1$, ... which alternates for every video signal for one field as indicated at (h) in FIG. 13. The compressed audio signals are transmitted through the modulator 19 and the gate circuits 20 and 21 to the adders 11 and 12 where they are added to the frequency modulated video signals. As a result the signal as shown at (i) is recorded by the head $H_A$ while the signal as shown at (j), by the head $H_B$.

In the playback mode, the demodulated audio signal is gated by the gate circuits 109 and 110 into the compressed audio signals of the channels 1 and 2 CH1 and CH2 and applied to the time expansion circuits 111 and 112, respectively. The time expanded audio signals are derived from the terminals 113 and 114, respectively.

The flip-flop 116 generates the pulse signal in response to which the writing into the memory circuits in the expansion circuits 111 and 112 is timed. The polarities of its output signals are determined in response to the PG pulse (b) as in the case of the flip-flop 102. Both the horizontal sync separators 103 and 117 generate the reference signal in response to which the write and read clocks are generated as described elsewhere with reference to FIG. 4.

The time compression circuits 106 and 107 and the time expansion circuits 111 and 112 are substantially similar in construction to that shown in FIG. 4 so that no further description thereof shall be made in this specification.

Figure 14:
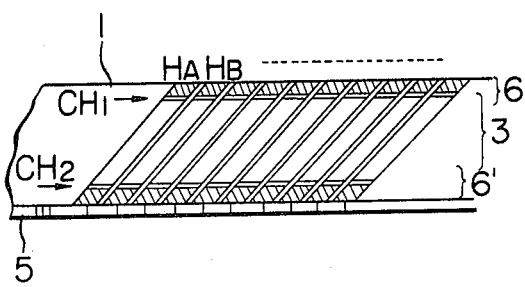
FIG. 14 shows another recording pattern for recording the video signal and two channel audio signals.
Figure 15:
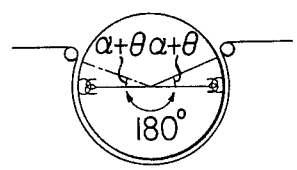
FIG. 15 is a view used for the explanation of the wrapping of a magnetic tape around a rotating cylinder in order to attain the recording pattern shown in FIG. 14.

Another embodiment of the system for recording and reproducing the audio signals of two channels is illustrated in FIGS. 14 and 15. As shown in FIG. 14, the audio signal of the first channel 1 CH1 are recorded at the upper edge portions of the oblique tracks while the audio signal of the second channel CH2, the lower edge portions of the oblique tracks. (If the magnetic tape 1 has a control track, the audio signal is recorded inwardly of the control track.)

The system for recording the two audio signals CH1 and CH2 as shown in FIG. 14 is substantially similar in construction to that described above with reference to FIG. 12, but the magnetic tape 1 must be wrapped further $\theta°$ both on the entering and leaving sides of the rotating cylinder as shown in FIG. 15. In order to correctly time the reproduction of the compressed audio signals, it is preferable to insert the burst signal P as described elsewhere with reference to FIG. 6.

Figure 16:
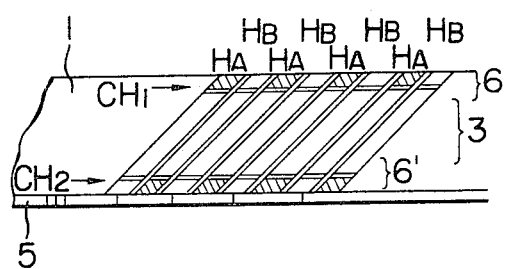
FIGS. 16-18 show various recording patterns for recording the video signal as well as two channel audio signals.

A still further system for recording and reproducing two audio signals is shown in FIG. 16. The audio signal of the channel CH1 is recorded at every two upper edge portions of the oblique tracks while the audio signal of the channel CH2, at over two lower edge portions of the oblique tracks. As with the system described with reference to FIG. 7, no cross talk results even when tracking error occurs. Furthermore the control signal may be recorded on the blank tracks for the audio signal of the second channel CH2 so that the control track shown in FIG. 16 may be eliminated.

Figure 17:
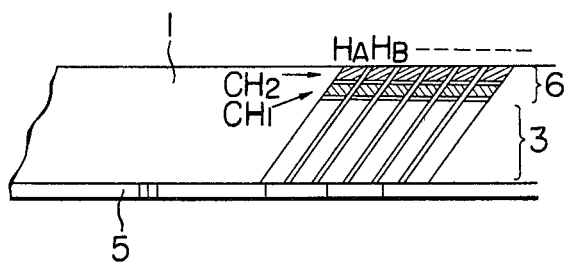

A yet further system for recording two audio signals is shown in FIG. 17. Both the time compressed audio signals of the channels CH1 and CH2 are recorded at the upper edge portions of the oblique tracks but are separated from each other by a guard. This system is apparent to those skilled in the art from the description of the systems with reference to FIGS. 3 and 13. In the record mode this system may time the compression of the audio signal of the channel CH2 with the completion of the time compression of the audio signal of the channel CH1. It is also preferable to insert the burst signal described with reference to FIG. 6.

Figure 18:
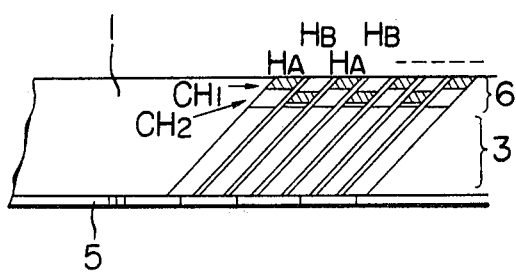

As in the case of the system described elsewhere with reference to FIG. 7, both the compressed audio signals of the channels CH1 and CH2 are recorded on every two tracks and are staggered from each other as shown in FIG. 18.

Figure 19:
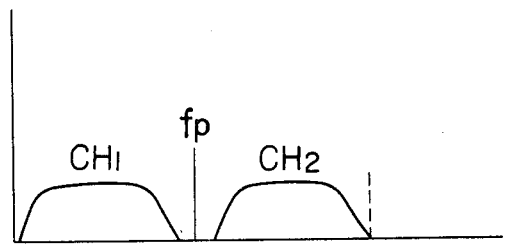
FIG. 19 is a view used for explanation of the recording of two channel audio signals by frequency division techniques.

A still further system for recording two audio signals is shown in FIG. 19. The compressed audio signal of the channel CH2 is subjected to the single sideband modulation (SSB) and recorded together with the compressed audio signal of the channel CH1 in frequency division manner in the recording pattern shown in FIG. 2, 7 or 10.

In FIG. 19 the signal $f_p$ is a pilot signal indicating that two audio signals are recorded and may be used as a carrier in case of the demodulation of the audio signal of the channel CH2. In this system the frequency multiplex signal as shown in FIG. 18 is modulated (preferably frequency modulated) and recorded. Instead of the single sideband modulation of the audio signal of the channel CH2, various modulations such as vestigal sideband modulation or vestigal sideband FM modulation may be used.

As described above, various systems may be used to compress two channel audio signals and record them on the magnetic tape contiguous with the video signal. It if is desired to erase the audio signal of one channel and record new audio signal, a stationary erase head may be used to erase the audio signal of one channel when the audio signals are recorded in the pattern as shown in FIG. 14 or 16 and then new audio signal may be recorded on erased tracks. Alternatively, new audio signal may be superposed on the previossly recorded audio signal when the recording pattern as shown in FIG. 11 or 17 is used.

In summary, according to the present invention even when the recording density is further increased so that the tape transportation speed is lowered, two channel audio signals may be positively recorded. The advantages of the present invention may be summarized as follows:

(1) The audio band of 15 KHz may be secured independently of the tape transportation speed.

(2) Adverse effects due to wow and flutter may be substantially eliminated because variations in rotational speeds in VTR is extremely small. Let $v_t$ denote the tape transportation speed and $v_H$, the peripheral speed of the rotating head. Then wow and flutter is given by $v_t/v_H$, which is in general less than 1/100. As a result, wow and flutter can be suppressed negligible when the rotating heads are used for the recording of the audio signal.

(3) Stationary audio signal recording and reproduction heads may be eliminated because the rotating video signal recording and reproduction heads may be used in recording the audio signal.

(4) Both the video and audio signals are recorded by common rotating magnetic heads, but it is also possible to record the audio signal after the video signal has been recorded. More particularly, the audio signal on the oblique audio tracks may be erased by a stationary erase head and new audio signal may be recorded. Furthermore it is possible to record new audio signal over the previously recorded audio signal because the previously recorded audio signal is erased and only the newly recorded audio signal remains. The reason is that the audio signal is modulated with high frequencies and recorded at short waves.

What is claimed is:

1. A magnetic recording and reproducing system of the type where a plurality of rotating magnetic heads record a television signal comprising video and audio signals on a magnetic medium as sequential discontinuous tracks, characterized in that the wrapping angle of said magnetic medium around a cylinder carrying said plurality of rotating magnetic heads is increased by an angle as compared with the conventional wrapping angle required for recording and reproducing the television signal; means for time compressing the audio signal; means including at least one of said plurality of rotating magnetic heads for recording the time compressed audio signal on the tracks laid down by said at least one magnetic head and extended by said increase in wrapping angle; means including said rotating magnetic heads for reproducing said television signal; and means coupled to said reproducing means for time expanding said time compressed audio signal to derive a continuous reproduced audio signal.

2. A magnetic recording and reproducing system as set forth in claim 1 further comprising means for inserting a pilot burst signal, synchronous with said time compressed audio signal, immediately before said time compressed audio signal, whereby said pilot burst signal may be used as a timing signal for starting the reproduction of the audio signal.

3. A magnetic recording and reproducing system as set forth in claim 1 further characterized in that the audio signal corresponding to a number of n fields of the television signal is compressed as a unit and recorded on the edge of said magnetic medium by said rotating magnetic heads.

4. A magnetic recording and reproducing system as set forth in claim 3, wherein said rotating magnetic heads consist of one rotating head for recording a first field of the television signal and, another rotating head for recording a second field of the television signal, said fields being recorded on succeeding discontinuous tracks inclined at an angle relative to the direction of transport of said magnetic medium, and said increased wrapping angle is $180° + 2\alpha + \theta$, where $(180° + 2\alpha)$ is the conventional wrapping angle.

5. A magnetic recording and reproducing system as set forth in claim 1 further comprising carrier frequency modulation means for varying the frequencies of the carriers modulated by said time compressed audio signal between alternate audio signal recording tracks.

6. A magnetic recording and reproducing system as set forth in claim 1 further characterized in that the audio signals of a plurality of channels are time compressed and recorded by respective rotating magnetic heads.

7. A magnetic recording and reproducing system as set forth in claim 6 further characterized in that the audio signal of one of the two channels is recorded on one edge of said magnetic medium while the audio signal of the other channel is recorded on the other edge thereof.

8. A magnetic recording and reproducing system as set forth in claim 1, further comprising means for time dividing the time compressed audio signals of two channels, and for recording the resulting time divided audio signals by means of said rotating magnetic heads.

9. A magnetic recording and reproducing system as set forth in claim 1 further characterized in that the time compressed audio signals of two channels are recorded lengthwise on a magnetic tape in such a way that the recorded audio signals may be spaced apart from each other.

* * * * *